United States Patent
Liu

(10) Patent No.: US 10,614,292 B2
(45) Date of Patent: Apr. 7, 2020

(54) LOW-POWER FACE IDENTIFICATION METHOD CAPABLE OF CONTROLLING POWER ADAPTIVELY

(71) Applicant: Kneron Inc., San Diego, CA (US)

(72) Inventor: Chun-Chen Liu, Taipei (TW)

(73) Assignee: Kneron Inc., San Diego, CA (US)

( * ) Notice: Subject to any disclaimer, the term of this patent is extended or adjusted under 35 U.S.C. 154(b) by 136 days.

(21) Appl. No.: 15/889,229

(22) Filed: Feb. 6, 2018

(65) Prior Publication Data

US 2019/0244011 A1     Aug. 8, 2019

(51) Int. Cl.
*G06K 9/00*     (2006.01)
*G06K 9/62*     (2006.01)

(52) U.S. Cl.
CPC ..... *G06K 9/00255* (2013.01); *G06K 9/00201* (2013.01); *G06K 9/6256* (2013.01)

(58) Field of Classification Search
CPC ........... G06K 9/00201; G06K 9/00255; G06K 9/6256
See application file for complete search history.

(56) References Cited

U.S. PATENT DOCUMENTS

| | | | |
|---|---|---|---|
| 6,377,700 B1 | 4/2002 | Mack | |
| 2004/0258297 A1 | 12/2004 | Yeh | |
| 2012/0056982 A1 | 3/2012 | Katz | |
| 2014/0293091 A1 | 10/2014 | Rhoads | |
| 2015/0125049 A1 | 5/2015 | Taigman | |
| 2015/0262024 A1* | 9/2015 | Braithwaite | ....... G06K 9/00255 382/118 |
| 2019/0130171 A1* | 5/2019 | Alameh | ............. G06K 9/00288 |

FOREIGN PATENT DOCUMENTS

| | | |
|---|---|---|
| TW | 200500952 | 1/2005 |
| TW | M364920 U1 | 9/2009 |

* cited by examiner

*Primary Examiner* — Nirav G Patel
(74) *Attorney, Agent, or Firm* — Winston Hsu

(57) ABSTRACT

A low-power face identification method includes detecting an object image, extracting two-dimensional image information of the object image, and when the two-dimensional image information is undetected as a face feature, disabling all related components for inhibiting a three-dimensional face recognition function.

15 Claims, 4 Drawing Sheets

LOW-POWER FACE IDENTIFICATION METHOD CAPABLE OF CONTROLLING POWER ADAPTIVELY

BACKGROUND OF THE INVENTION

1. Field of the Invention

The present invention illustrates a low-power face identification system and low-power face identification method, and more particularly, a low-power face identification system and low-power face identification method capable of controlling power adaptively.

2. Description of the Prior Art

With rapid advancement of technologies, human-to-computer interaction technologies in conjunction with artificial intelligence technologies are popularly adopted in our living for many operations and applications, such as language operations (i.e., typing, voice recognitions, on-screen text displays, speech syntheses) and vision operations (i.e., video cameras and graphic displays). Specifically, face detection technologies and face recognition technologies belong to two important categories of human-to-human communications and thereby are important for human-to-computer interactions as well. Many identity identification methods and available applications are operated based on face detection and face recognition technologies, such as human emotion detection, a gender classification, a lip reading, and an eye/gaze tracking.

Conventional face detection, face recognition, or face tracking function can be performed by using computing-intensive algorithms. It requires at least one high-speed, power-hungry microprocessor with a high data rate for processing a large number of operands, and also requires heavy usage of a memory. For example, a face detection function, a two-dimensional face recognition function, and a three-dimensional face recognition function can be integrated to a smartphone for providing accurate and reliable face identification performance. Specifically, the face detection function, the two-dimensional face recognition function, and the three-dimensional face recognition function are three resident programs. However, since a camera and a processor have to be always turned on for executing the face detection function, the two-dimensional face recognition function, and the three-dimensional face recognition function, it implies that power consumption of the smartphone is severe. The severe power consumption reduces service time of the smartphone, a portable electronic device or a battery-powered device.

Thus, to develop a face identification method for adaptively controlling power utilizations among the face detection function, the two-dimensional face recognition function, and the three-dimensional face recognition function without any accuracy or performance degradation is an important issue.

SUMMARY OF THE INVENTION

In an embodiment of the present invention, a low-power face identification system is disclosed. The low-power face identification system comprises a transceiver, an artificial intelligence chip, a decoder, an image converter, and an encoder. The transceiver is configured to emit at least one first light signal to an object and receive at least one second light signal reflected by the object. The artificial intelligence chip is coupled to the transceiver. The decoder is coupled to the transceiver and the artificial intelligence chip, and configured to receive the at least one second light signal, decode the at least one second light signal to generate a decoded light signal, and transmit a part of the decoded light signal to the artificial intelligence chip. The image converter is coupled to the decoder and the artificial intelligence chip, and configured to convert a two-dimensional image of the object to a three-dimensional image of the object according to the decoded light signal, and output a three-dimensional face image from the three-dimensional image of the object when a two-dimensional face image is successfully detected and recognized from the two-dimensional image of the object by the artificial intelligence chip. The encoder is coupled to the image converter and configured to encode data of the three-dimensional face image after the three-dimensional face image is generated. After the part of decoded light signal is received by the artificial intelligence chip, the artificial intelligence chip disables the image converter when the two-dimensional face image is undetected or unrecognized.

In another embodiment of the present invention, a low-power face identification method is disclosed. The low-power face identification method comprises emitting at least one first light signal to an object, receiving at least one second light signal reflected by the object, decoding the at least one second light signal to generate a decoded light signal, extracting two-dimensional image information from the decoded light signal, performing a two-dimensional face detection function by an artificial intelligence chip according to the two-dimensional image information and two-dimensional face training data, inhibiting a two-dimensional face recognition function when a two-dimensional face is undetected, and disabling an image converter by the artificial intelligence chip in order to inhibit a three-dimensional face recognition function when the two-dimensional face recognition function is inhibited.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
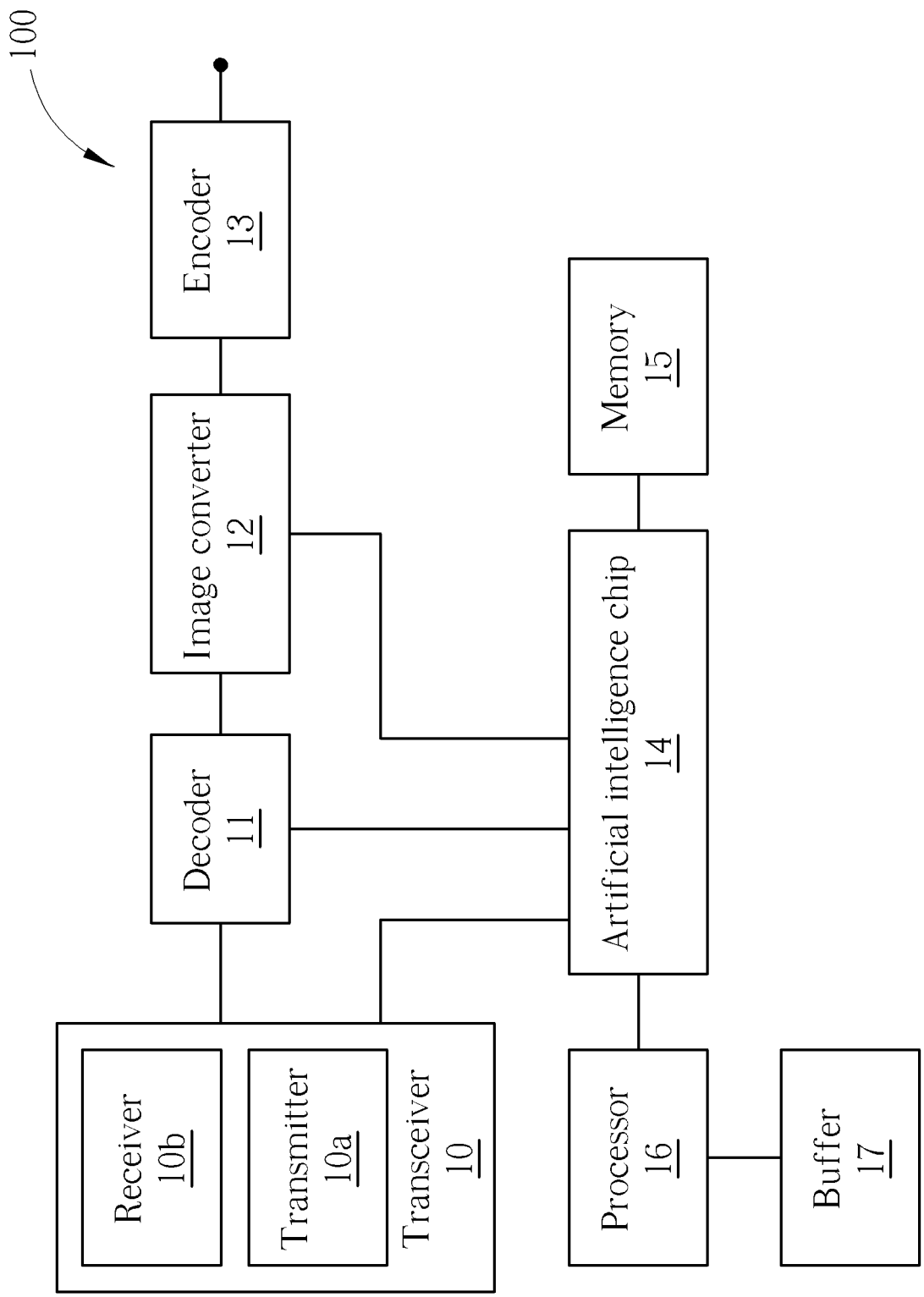
FIG. 1 is a block diagram of a low-power face identification system according to an embodiment of the present invention.

FIG. 1 is a block diagram of a low-power face identification system 100 according to an embodiment of the present invention. The low-power face identification system 100 can be applied to any portable or mobile device with an embedded or non-embedded artificial chip. The portable or mobile device can be categorized as a battery-powered device so it has a limited service time. The low-power face identification system 100 includes a transceiver 10, an artificial intelligence chip 14, a decoder 11, an image converter 12, and an encoder 13. The transceiver 10 is used for emitting at least one first light signal to an object and receiving at least one second light signal reflected by the object. The transceiver 10 can include a transmitter 10a and a receiver 10b. The transmitter 10a can include a dual camera light emitting lens for emitting two first light signals to the object with different angles of incidence. The receiver 10b can be used for receiving two second light signals reflected by the object. The transmitter 10a can include a three-dimensional (3D) structured light emitting device for emitting at least one 3D structured light signal to the object, and a two-dimensional (2D) light emitting device (i.e., for example, a single camera lens) for emitting a 2D light signal to the object. The receiver 10b can be used for receiving a plurality of second light signals reflected by the object. Here, the object can be a human body or a part of human body in an image. The transceiver 10 can also include a near infrared sensor (NIR sensor) for detecting an optical signal outside a visible spectrum reflected by the object. In the low-power face identification system 100, any reasonable hardware design of the transceiver 10 capable of capturing 2D and/or 3D image information falls into the scope of the present invention. The artificial intelligence chip 14 is coupled to the transceiver 10 for controlling the transceiver 10 and then performing image processing operations. The artificial intelligence chip 14 can be embedded in a main processor, or can be a non-embedded chip. The artificial intelligence chip 14 can be a convolutional neural network (CNN) based chip, a recurrent neural network (RNN) based chip, or an artificial intelligence accelerator for accelerating artificial neural networks, machine visions and other machine learning algorithms. The decoder 11 is coupled to the transceiver 10 and the artificial intelligence chip 14. The decoder 11 is used for receiving the at least one second light signal, decoding the at least one second light signal to generate a decoded light signal, and transmitting a part of the decoded light signal to the artificial intelligence chip 14. As previously mentioned, the transceiver 10 can use the dual camera light emitting lens, the 3D structured light emitting device, and the 2D light emitting device for capturing 2D and 3D image information of the object. Therefore, the decoder 11 can receive a signal bearing optical information from the transceiver 10 and then generate the decoded light signal bearing 2D and 3D image information accordingly. Specifically, in order to reduce power consumption, only a part of the decoded light signal (i.e., bearing the 2D image information) is received by the artificial intelligence chip 14. The artificial intelligence chip 14 can perform a 2D face detection function and/or a 2D face recognition function according to the part of the decoded light signal.

When a 2D face image is successfully detected and recognized from a 2D image of the object according to the part of the decoded light signal by the artificial intelligence chip 14, the artificial intelligence chip 14 enables the image converter 12 coupled to the decoder 11 for converting the 2D image of the object to a 3D image of the object according to the decoded light signal outputted from the decoder 11. Then, the image converter 12 can output a 3D face image from the 3D image of the object to the encoder 13. The encoder 13 is coupled to the image converter 12 for encoding data of the 3D face image after the 3D face image is generated. Also, the artificial intelligence chip 14 can further perform a 3D face recognition function after the 3D face image is generated. Briefly, after the 2D face image of the object is successfully detected, the 2D face image is further processed to be recognized as of a 2D user identifier (i.e., such as a user name or a user unique identification number). After the 2D face image is successfully recognized, the 2D to 3D image conversion process is performed by the image converter 12 for preparing to start the 3D face recognition function.

When the 2D face image is successfully detected but fails to recognize, the artificial intelligence chip 14 can disable the image converter 12 in order to inhibit the 2D to 3D image conversion process and the 3D face recognition function. When the 2D face image is undetected, the artificial intelligence chip 14 can inhibit the 2D face recognition function. Further, the artificial intelligence chip 14 can disable the image converter 12 in order to inhibit the 2D to 3D image conversion process and the 3D face recognition function. In other words, after the part of decoded light signal (i.e., bearing 2D image information) is received by the artificial intelligence chip 14, the artificial intelligence chip 14 disables the image converter 12 when the 2D face image is undetected or unrecognized. By adaptively controlling the 2D face detection function, the 2D face recognition function, and the 3D face recognition function, unnecessary driving power can be reduced, prolonging service time of the smartphone or the battery-powered device.

In the low-power face identification system 100, a memory 15 is coupled to the artificial intelligence chip 14 for saving 2D face training data and 3D face training data. In the embodiment, a user can add 2D face image data corresponding to a 2D user identifier and 3D face image data corresponding to a 3D user identifier to the training data. The memory 15 can be an electrically-erasable programmable read-only memory (EEPROM). Further, the low-power face identification system 100 can optionally introduce a processor 16 and a buffer 17 coupled to the processor 16. The processor 16 can be used for assisting the artificial intelligence chip 14 in detecting the 2D face image and recognizing the 2D and 3D face images. The buffer 17 can be used for providing a buffer space for image processing data. The buffer 17 can be a flash memory.

Figure 2:
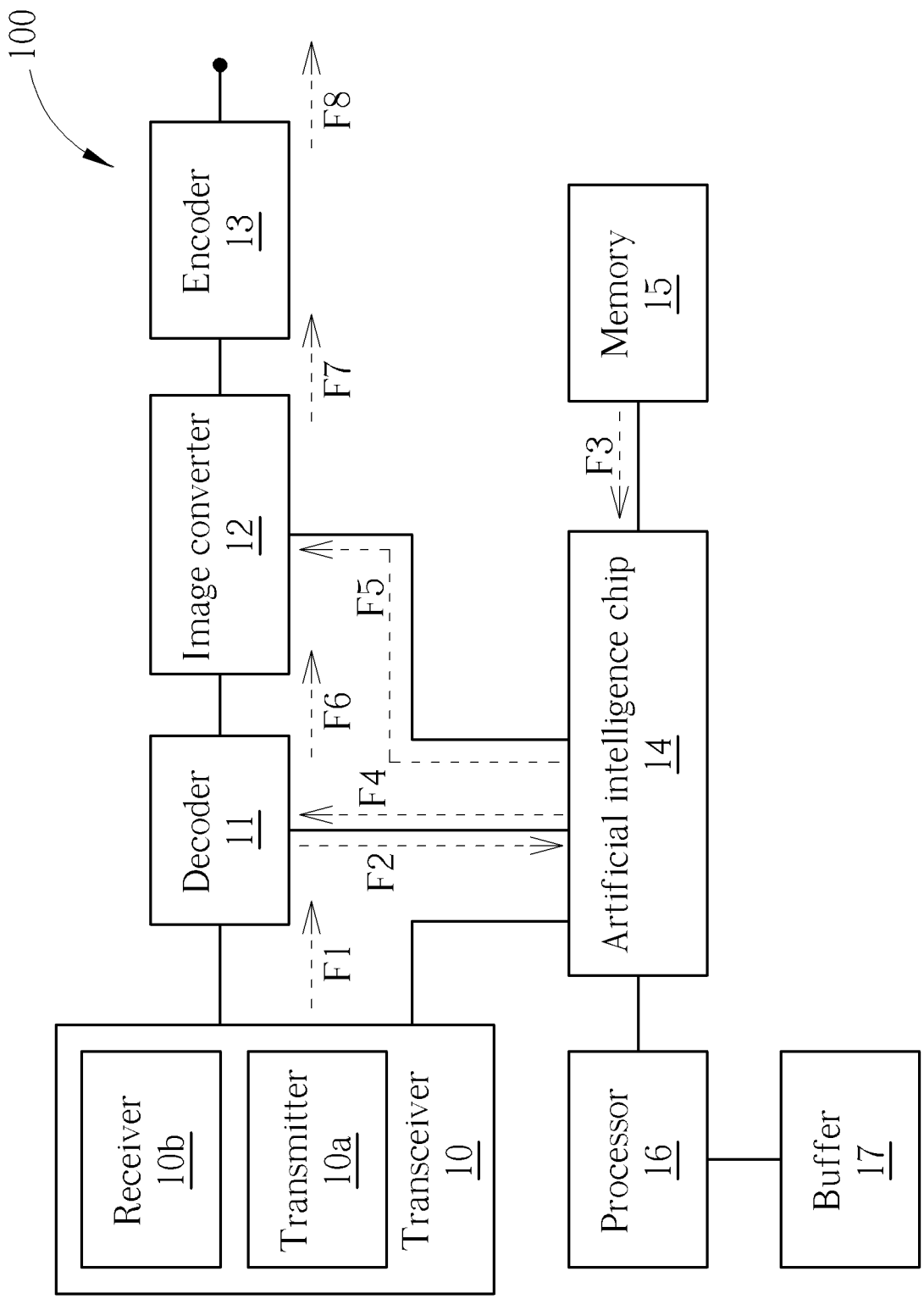
FIG. 2 is an illustration of signal flows of the low-power face identification system in FIG. 1 under a first operation mode.

FIG. 2 is an illustration of signal flows of the low-power face identification system 100 under a first operation mode. In the embodiment, the first operation mode is performed under a condition of the 2D face image being successfully detected and recognized from the 2D image of the object by the artificial intelligence chip 14. Here, since the processor 16 and the buffer 17 are optional, they are omitted in FIG. 2. In the low-power face identification system 100, first, the transmitter 10a emits at least one first light signal to the object. If a light absorption rate of the object is smaller than 100%, it can reflect the least one first light signal to generate at least one second light signal. The at least one second light signal can be received by the receiver 10b. Then, the at least one second light signal bearing 2D image information and 3D image information can be transmitted from the transceiver 10 to the decoder 11. The decoder 11 can receive the at least one second light signal through a data flow F1. The decoder 11 can decode the at least one second light signal to generate a decoded light signal. To reduce addition power consumption, only a part of the decoded light signal (i.e., bearing 2D image information) is extracted from the decoded light signal. The part of the decoded light signal is transmitted from the decoder 11 to the artificial intelligence chip 14 through a data flow F2. After the artificial intelligence chip 14 receives the 2D image information, the artificial intelligence chip 14 can perform the 2D face detection function. When the 2D face image is successfully detected from the 2D image of the object, the artificial intelligence chip 14 executes the 2D face image recognition function. In the embodiment, the artificial intelligence chip 14 can generate a recognition result of the 2D face image by checking a likelihood of the 2D face image detected from the 2D image of the object and 2D face training data stored in the memory 15 through a data flow F3. For example, when the 2D face image is successfully recognized as of a 2D user identifier, the artificial intelligence chip 14 can generate the recognition result including a recognition success message for notifying the user and continuing a next step. At the moment, the artificial intelligence chip 14 can transmit a control signal to the decoder 11 through a data flow F4, and transmit a control signal to the image converter 12 through a data flow F5. After the image converter 12 receives the control signal, the image converter 12 is enabled. Then, the decoder 11 can transmit the decoded light signal to the image converter 12 through a data flow F6 for converting the 2D image of the object to the 3D image of the object according to the decoded light signal. For example, the image converter 12 can convert the 2D image of the object to the 3D image of the object by using the 2D image information and the 3D image information in form of a bitmap information matrix. After the 3D image of the object is generated, a 3D face image of the 3D image of the object can be outputted from the image converter 12 to the encoder 13 through a data flow F7. The encoder 13 can encode data of the 3D face image and then transmit the encoded 3D face image to an output terminal through a data flow F8. At the moment, the artificial intelligence chip 14 can also perform the 3D face image recognition function for recognizing the 3D face image as of a 3D user identifier since the artificial intelligence chip 14 is coupled to the image converter 12 and can acquire 3D face image information.

Figure 3:
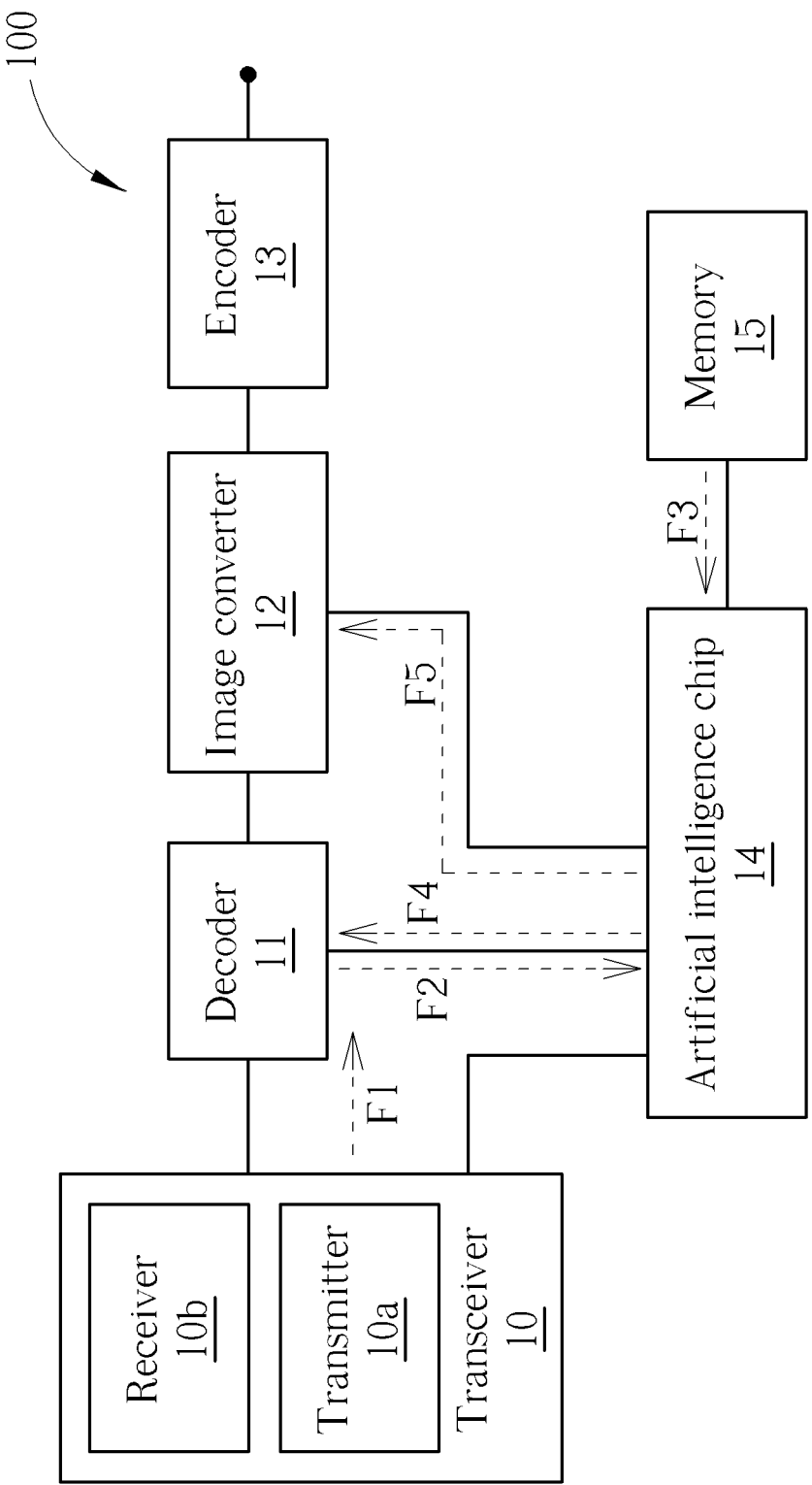
FIG. 3 is an illustration of signal flows of the low-power face identification system in FIG. 1 under a second operation mode.

FIG. 3 is an illustration of signal flows of the low-power face identification system 100 under a second operation mode. In the embodiment, the second operation mode is performed under a condition of the 2D face image being undetected or unrecognized. Here, since the processor 16 and the buffer 17 are optional, they are omitted in FIG. 3. Similarly, the transmitter 10*a* emits at least one first light signal to the object. If a light absorption rate of the object is smaller than 100%, it can reflect the least one first light signal to generate at least one second light signal. The at least one second light signal can be received by the receiver 10*b*. Then, the at least one second light signal bearing 2D image information and 3D image information can be transmitted from the transceiver 10 to the decoder 11. The decoder 11 can receive the at least one second light signal through a data flow F1. The decoder 11 can decode the at least one second light signal to generate a decoded light signal. To reduce addition power consumption, only a part of the decoded light signal (i.e., bearing 2D image information) is extracted from the decoded light signal. The part of the decoded light signal is transmitted from the decoder 11 to the artificial intelligence chip 14 through a data flow F2. After the artificial intelligence chip 14 receives the 2D image information, the artificial intelligence chip 14 can perform the 2D face detection function. After the 2D face image is successfully detected from the 2D image of the object, the artificial intelligence chip 14 executes the 2D face image recognition function. As previously mentioned, the artificial intelligence chip 14 can generate the recognition result of the 2D face image by checking the likelihood of the 2D face image detected from the 2D image of the object and 2D face training data stored in the memory 15 through a data flow F3. Unfortunately, when the 2D face image is unrecognized, the artificial intelligence chip 14 can generate a recognition result bearing recognition failure message for notifying the user. In another case, when the 2D face image is undetected, the artificial intelligence chip 14 inhibits the 2D face rec-ognition function. When the 2D face image is undetected or unrecognized, the artificial intelligence chip 14 can transmit a control signal to the decoder 11 through a data flow F4, and transmit a control signal to the image converter 12 through a data flow F5. After the image converter 12 receives the control signal, the image converter 12 is disabled. By doing so, data transmission of the decoded light signal from the decoder 11 to the image converter 12 is blocked. Since the image converter 12 is disabled, the image converter 12 and the encoder 13 can be regarded as two dummy components. Therefore, the 2D to 3D image conversion process and the 3D face image recognition function are not performed. Briefly, since the 2D face image is undetected or unrecognized, it is unnecessary to perform the 3D face image recognition function and the 2D to 3D image conversion process since they can be regarded as two redundant image functions with additional driving power requirements. By disabling (or say, inhibiting) the 3D face image recognition function and the 2D to 3D image conversion process, unnecessary driving power can be reduced.

The embodiments in FIG. 2 and FIG. 3 illustrate an adaptive power control mechanism of the low-power face identification system 100. In the low-power face identification system 100, the artificial intelligence chip 14 uses a first driving power to perform the 2D face detection function. The artificial intelligence chip 14 uses a second driving power to perform the 2D face image recognition function. The artificial intelligence chip 14 uses a third driving power to perform the 3D face image recognition function. The first driving power is smaller than the second driving power. The second driving power is smaller than the third driving power. The low-power face identification system 100 can use full power for performing the 2D face detection function, the 2D face image recognition function, and the 3D face image recognition function when the 2D face image is successfully detected and recognized. However, the low-power face identification system 100 can disable some unnecessary hardware components for reducing power consumption when the 2D face image is undetected or unrecognized. In other words, the 2D face detection function is a resident program. The 2D face recognition function and the 3D face recognition function are non-resident programs.

Figure 4:
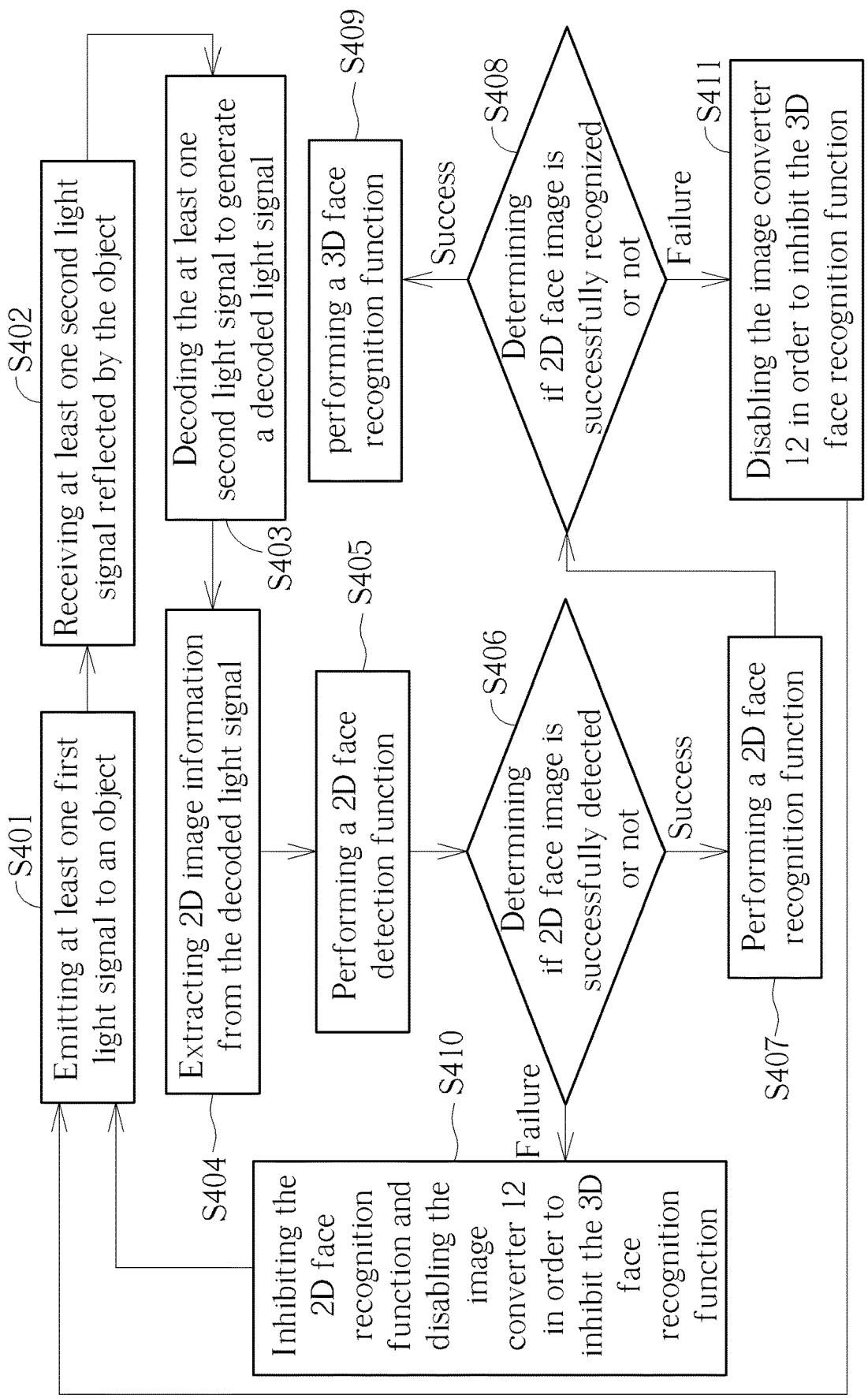
FIG. 4 is a flowchart of a low-power face identification method performed by using the low-power face identification system in FIG. 1.

FIG. 4 is a flowchart of a low-power face identification method performed by using the low-power face identification system 100. The low-power face identification method includes step S401 to step S411. Any reasonable hardware or technology modification falls into the scope of the present invention. Step S401 to step S411 are illustrate below.

step S401: emitting at least one first light signal to an object;
step S402: receiving at least one second light signal reflected by the object;
step S403: decoding the at least one second light signal to generate a decoded light signal;
step S404: extracting 2D image information from the decoded light signal;
step S405: performing a 2D face detection function by the artificial intelligence chip 14 according to the 2D image information;
step S406: determining if a 2D face image is successfully detected; if the 2D face image is successfully detected, executing step S407; if the 2D face image is undetected, executing step S410;
step S407: performing a 2D face recognition function by the artificial intelligence chip 14;
step S408: determining if the 2D face image is successfully recognized; if the 2D face image is successfully recognized, executing step S409; if the 2D face image is unrecognized, executing step S411;

step S409: performing a 3D face recognition function.

Step S410: inhibiting the 2D face recognition function and disabling the image converter 12 by the artificial intelligence chip 14 in order to inhibit the 3D face recognition function, and returning to step S401.

Step S411: disabling the image converter 12 by the artificial intelligence chip 14 in order to inhibit the 3D face recognition function, and returning to step S401.

Step S401 to step S411 are illustrated in aforementioned embodiments. Thus, illustrations of step S401 to S411 are omitted here. In the low-power face identification system 100, since the recognition accuracy of the 3D face recognition function (i.e., 99.999999%) is greater than the 2D face recognition (i.e., 98%-99%), a preferred embodiment is provided by introducing step S408 to S411 for increasing the recognition accuracy. However, the present invention is not limited to using step S401 to S411 for identifying the face image. For example, when a smartphone is lack of hardware components of the dual camera light emitting lens or the 3D structured light emitting device, the smartphone can only perform 2D face recognition function for recognizing the face image with lower recognition accuracy. Further, the low-power face identification system 100 is suitable for applying to a powerful and multi-functional smartphone capable of processing 2D and 3D images. Since the low-power face identification system 100 can adaptively disable unnecessary image functions for minimizing power consumption, service time of the smartphone or the battery-powered device can be prolonged.

To sum up, the present invention discloses a low-power face identification system and a low-power face identification method. The low-power face identification system uses an artificial intelligence chip for processing a 2D face detection function, a 2D face recognition function, and a 3D face recognition function. Since the low-power face identification system can adaptively control operations of the 2D face detection function, the 2D face recognition function, and the 3D face recognition function, unnecessary driving power can be reduced. In other words, the 2D face recognition function and the 3D face recognition function are non-resident programs. Since the unnecessary driving power can be reduced, service time of the smartphone or the battery-powered device can be extended.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A low-power face identification system comprising:
    a transceiver configured to emit at least one first light signal to an object and receive at least one second light signal reflected by the object;
    an artificial intelligence chip coupled to the transceiver;
    a decoder coupled to the transceiver and the artificial intelligence chip, and configured to receive the at least one second light signal, decode the at least one second light signal to generate a decoded light signal, and transmit two-dimensional image information of the object of the decoded light signal to the artificial intelligence chip;
    an image converter coupled to the decoder and the artificial intelligence chip, and configured to convert a two-dimensional image of the object to a three-dimensional image of the object according to the decoded light signal, and output a three-dimensional face image from the three-dimensional image of the object when a two-dimensional face image is successfully detected and recognized from the two-dimensional image of the object by the artificial intelligence chip;
    an encoder coupled to the image converter and configured to encode data of the three-dimensional face image after the three-dimensional face image is generated;
    wherein after the two-dimensional image information of the object of the decoded light signal is received by the artificial intelligence chip, the artificial intelligence chip disables the image converter when the two-dimensional face image is undetected or unrecognized; and
    wherein the artificial intelligence chip uses a first driving power to perform a two-dimensional face detection function, the artificial intelligence chip uses a second driving power to perform a two-dimensional face image recognition function, the artificial intelligence chip uses a third driving power to perform a three-dimensional face image recognition function, the first driving power is smaller than the second driving power, and the second driving power is smaller than the third driving power.

2. The system of claim 1, wherein the two-dimensional face image is recognized as of a user identifier after the two-dimensional face image is detected from the two-dimensional image of the object.

3. The system of claim 1, wherein the decoded light signal comprises the two-dimensional image information and three-dimensional image information of the object.

4. The system of claim 3, wherein the three-dimensional image information of the object is a bitmap information matrix of the object.

5. The system of claim 1, wherein the transceiver comprises:
    a dual camera light emitting lens configured to emit two first light signals to the object with different angles of incidence; and
    a receiver configured to receive two second light signals reflected by the object.

6. The system of claim 1, wherein the transceiver comprises:
    a three-dimensional structured light emitting device configured to emit at least one three-dimensional structured light signal to the object;
    a two-dimensional light emitting device configured to emit a two-dimensional light signal to the object; and
    a receiver configured to receive a plurality of second light signals reflected by the object.

7. The system of claim 1, wherein the transceiver comprises a near infrared sensor (NIR sensor) configured to detect an optical signal outside a visible spectrum reflected by the object.

8. The system of claim 1, further comprising:
    a memory coupled to the artificial intelligence chip and configured to save two-dimensional face training data and three-dimensional face training data.

9. The system of claim 8, wherein the artificial intelligence chip generates a recognition result of the two-dimensional face image by checking a likelihood of the two-dimensional face image detected from the two-dimensional image of the object and two-dimensional face training data stored in the memory.

10. The system of claim 9, wherein the memory is an electrically-erasable programmable read-only memory (EEPROM).

11. The system of claim 1, further comprising:
a processor coupled to the artificial intelligence chip and configured to assist the artificial intelligence chip in detecting the two-dimensional face image and recognizing the two-dimensional and three-dimensional face images; and
a buffer coupled to the processor and configured to provide a buffer space for image processing data.

12. The system of claim 11, wherein the buffer is a flash memory.

13. The system of claim 1, wherein the two-dimensional face detection function is a resident program, and the two-dimensional face recognition function and the three-dimensional face recognition function are non-resident programs.

14. A low-power face identification method comprising:
emitting at least one first light signal to an object;
receiving at least one second light signal reflected by the object;
decoding the at least one second light signal to generate a decoded light signal;
extracting two-dimensional image information from the decoded light signal;
performing a two-dimensional face detection function by an artificial intelligence chip according to the two-dimensional image information;
inhibiting a two-dimensional face recognition function when a two-dimensional face is undetected; and
disabling an image converter by the artificial intelligence chip in order to inhibit a three-dimensional face recognition function when the two-dimensional face recognition function is inhibited;
wherein the two-dimensional face detection function is a resident program, and the two-dimensional face recognition function and the three-dimensional face recognition function are non-resident programs.

15. The method of claim 14, wherein the decoded light signal comprises the two-dimensional image information and the three-dimensional image information, and the artificial intelligence chip receives the two-dimensional image information extracted from the decoded light signal for performing the two-dimensional face detection function.

* * * * *